United States Patent [19]

Otsuka et al.

[11] 4,349,867
[45] Sep. 14, 1982

[54] CONTROL APPARATUS FOR A CYCLOCONVERTER

[75] Inventors: Kenichi Otsuka, Kodaira; Hiroshi Uchino, Hachioji; Kihei Nakajima, Yokohama, all of Japan

[73] Assignee: Tokyo Shibaura Denki Kabushiki Kaisha, Kawasaki, Japan

[21] Appl. No.: 241,100

[22] Filed: Mar. 6, 1981

[30] Foreign Application Priority Data

Mar. 26, 1980 [JP] Japan .................................. 55-38649

[51] Int. Cl.³ .......................................... H02M 5/257
[52] U.S. Cl. ................................... 363/160; 363/164; 323/207; 323/246
[58] Field of Search .................. 363/160, 161, 164, 37, 363/79, 85, 88; 323/207, 241, 246

[56] References Cited

U.S. PATENT DOCUMENTS

| | | | |
|---|---|---|---|
| 3,609,509 | 9/1971 | Lafuze | 363/161 |
| 3,959,719 | 5/1976 | Espelage | 323/207 |
| 3,959,720 | 5/1976 | Bose et al. | 323/207 |
| 4,013,937 | 3/1977 | Pelly et al. | 363/161 X |
| 4,074,348 | 2/1978 | Salzmann et al. | 363/160 |

OTHER PUBLICATIONS

Cycloconverters and Automatic Control of Ring Motors Driving Tube Mills by Theodore Salzmann; Siemens Review, vol. 45, No. 1, Jan. 1978, pp. 3–8.

*Primary Examiner*—William M. Shoop
*Assistant Examiner*—Peter S. Wong
*Attorney, Agent, or Firm*—Oblon, Fisher, Spivak, McClelland & Maier

[57] ABSTRACT

A control apparatus for a cycloconverter includes m sets of bridge converters connected between the input terminals of an m-phase load (m≧3) and is applied for a cycloconverter of which the common connection point of the bridge converters is disconnected from a neutral point of the load. The output voltage of each bridge converter is controlled by a reference voltage signal during a 1/m period of one cycle of the load voltage. The center of the 1/m period is located at a positive or negative maximum amplitude point of the load voltage. The output voltage is also controlled during the remaining period of $(1-1/m)$ by a phase control input signal corresponding to a difference between a reference current signal and the load current. The reference voltage signal and the phase control input signal are selected by switching signals from a logic circuit for detecting phase voltages of the load to alternately be applied to the phase control circuits.

6 Claims, 10 Drawing Figures

CONTROL APPARATUS FOR A CYCLOCONVERTER

BACKGROUND OF THE INVENTION

The present invention relates to a control apparatus for a cycloconverter and, more particularly, to a control apparatus for a cycloconverter which improves an input power factor of the cycloconverter.

A cycloconverter is an apparatus for directly converting AC power with a first frequency into another AC power with a second frequency. As well known, a cycloconverter having the combination of a plurality of bridge converters of the natural commutation type has been used as a frequency converter with a large capacity, because it is stably operable under quick-response control. The input power factor of the cycloconverter is inferior to that of the DC converter. Thus, the input to the cycloconverter contains a large amount of reactive power component. Since a voltage across a load connected to the output terminal of the cycloconverter generally takes a sinusoidal waveform, the AC input voltage to the cycloconverter is selected so that the output voltage of a bridge converter (voltage between a common connection point of the bridge converters and a load connecting terminal of the corresponding bridge converter) can reach a crest value of the sinusoidal load voltage. Even if the crest value of the load voltage is equal to the maximum output voltage of the cycloconverter, voltage values in most regions of one cycle of a load voltage is smaller than the maximum output voltage value of the cycloconverter.

A plurality of SCR's (silicon controlled rectifiers) of each of the bridge converters, which constitute the cycloconverter, receive at the gates control signals supplied from a control apparatus for the cycloconverter and undergoes the control of the control signals. It is assumed that the control delay angle of each SCR is $\alpha$. It is also assumed that the output frequency of the cycloconverter is zero, that is, a constant DC current flows from the cycloconverter. Under this ideal operating condition of the cycloconverter, the input power factor of the cycloconverter is $\cos \alpha$, the DC output voltage of the cycloconverter is proportional to $\cos \alpha$, and the reactive input power to the cycloconverter is proportional to $\sin \alpha$. In order to improve the input power factor to the cycloconverter by reducing the reactive input power to the respective bridge converters, each bridge converter must be controlled, therefore, so as to produce a positive or negative output voltage, which is as large as possible, over tolerable widest possible part of one cycle period of the load phase voltage.

The input power factor of the cycloconverter depends largely on a voltage conversion ratio $\lambda$ ($\lambda$ = crest value of the load voltage/maximum value of an ideal output voltage of a cycloconverter, i.e. the output voltage of the cycloconverter when the control delay angle $\alpha$ of each SCR is zero), and a power factor of the load itself. The larger the voltage conversion ratio and the power factor of the load itself, the better the input power factor of the cycloconverter is improved. Disregarding this fact, however, the output voltage of each bridge converter in the conventional cycloconverter is so controlled as to have a sinusoidal waveform. Therefore, the input power factor of the cycloconverter was lower than that of a DC converter.

SUMMARY OF THE INVENTION

Accordingly, an object of this invention is to provide a control apparatus for a cycloconverter which improves the input power factor of the cycloconverter by controlling it in a manner that the positive or negative output voltage of the cycloconverter is greater than the voltage of the load connected to the cycloconverter.

According to the present invention, there is provided a control apparatus for a cycloconverter which is connected to a multiphase AC power source and includes m sets of bridge converters each of which has a first output terminal connected to a common connection point and a second output terminal connected to a corresponding input terminal of a m-phase load (m≧3) disconnected from the common connection point, and is comprised of silicon controlled rectifier (SCR) elements. The control apparatus comprises: voltage control means for controlling the output voltages of the bridge converters in accordance with a predetermined reference voltage signal; current control means for controlling the output voltages from said bridge converters in accordance with a phase control input signal dependent on a difference between a reference current signal to determine the output currents from the bridge converters and the load current of the load; and switching means for periodically switching the voltage control means and the current control means in accordance with a phase of the load voltage. The voltage control means controls by the reference voltage signal the output voltage from the bridge converter corresponding to a load voltage during a 1/m period of one cycle of the load voltage, the center of the 1/m period being located at a positive OR negative maximum amplitude point of the load voltage. The current control means controls by the phase control input signal the output voltage of the bridge converter during the remaining (1−1/m) period of the one cycle of the load voltage. The switching means introduces each phase voltage of the load into a logic circuit, effects a predetermined switching by the output signal from the logic circuit thereby to select the voltage control means and the current control means in accordance with a phase of the load voltage.

According to the present invention, the cycloconverter is controlled so as to produce a higher positive or negative output voltage than the load voltage, whereby the input power factor of the cycloconverter is improved.

Other objects and features of the invention will be understood from the following description taken in connection with the accompanying drawings, in which:

DETAILED DESCRIPTION OF THE PREFERRED EMBODIMENTS

Figure 1:
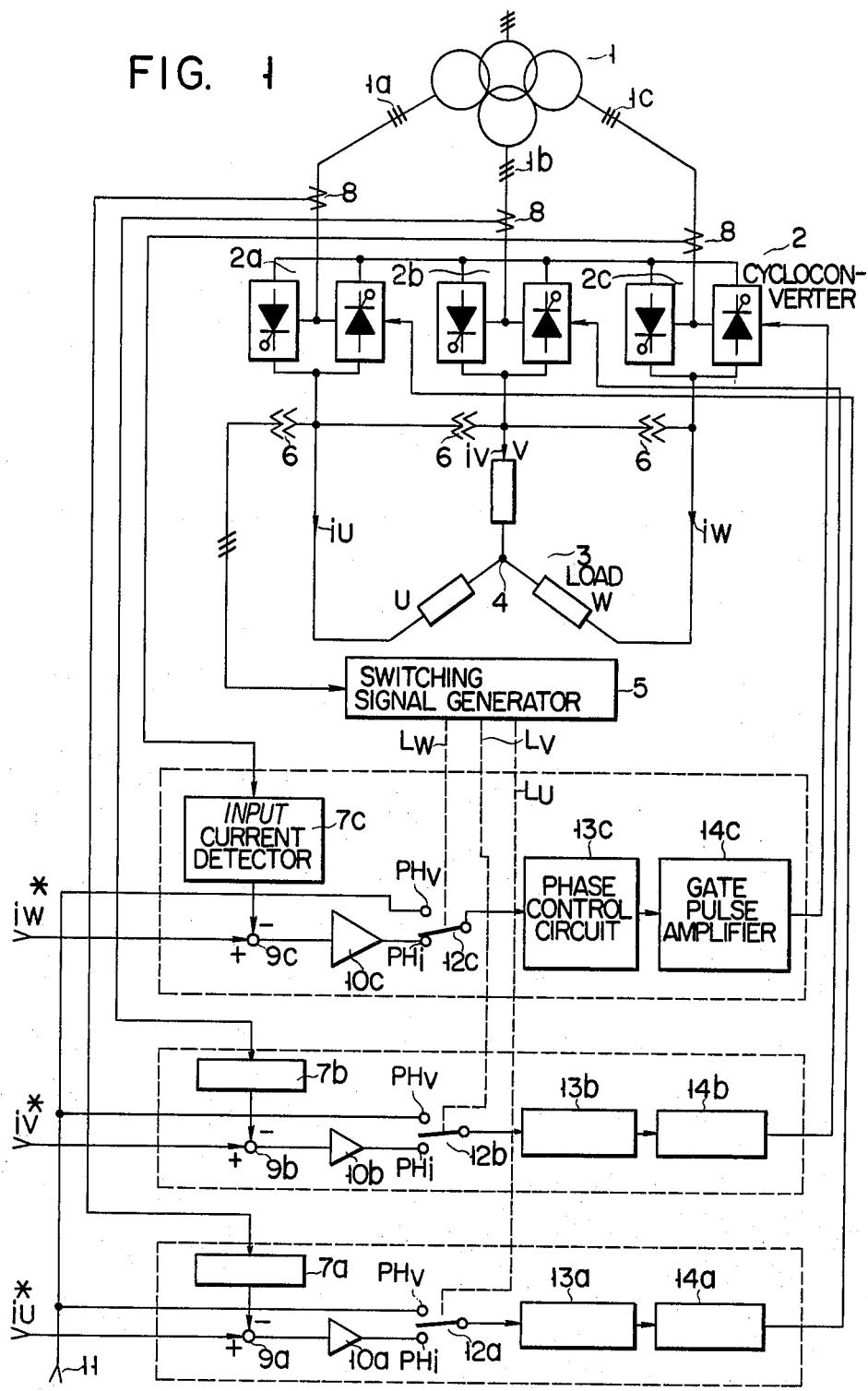
FIG. 1 is a circuit diagram of a cycloconverter system to which an embodiment of a control apparatus for a cycloconverter according to this invention is applied.

The present invention will be described by using a control apparatus for a cycloconverter for supplying power with a desired frequency to a three-phase load star-connected, for simplicity. In FIG. 1, three-phase outputs 1a, 1b and 1c from a three-phase input transformer 1, respectively, are supplied to bridge converters 2a, 2b and 2c, those forming a cycloconverter 2. Each bridge converter is comprised of two of three-phase full wave rectifiers connected in antiparallel fashion, each rectifier including a plurality of silicon controlled rectifier elements (SCR). One ends (first output terminal) of the bridge converters are connected to a common connection point, while the other ends (second output terminals) of these converters are connected to the input terminals of a load 3. The load 3 may be either a LR load or an AC motor load; however, the LR load is employed as the load 3 in the present embodiment. Load current of U, V and W phases are denoted as $i_U$, $i_V$ and $i_W$, respectively, and a neutral point of the load 3 is designated by reference numeral 4. The common connection point of the bridge converters 2a to 2c is disconnected from the neutral point 4 of the load. The load currents $i_U$, $i_V$ and $i_W$ have each a sinusoidal waveform. A switching signal generator 5 computes respective phases of the phase voltages of the load to produce switching signals for actuating switching means to be described later. Specifically, the switching signal generator 5 receives through potential transformers (PT) 6 load voltages to produce signals $L_U$, $L_V$ and $L_W$ for actuating the switch means at a given timing. The details of the switching signal generator will be described with reference to FIG. 2. Current detector circuits 7a to 7c detect AC input currents flowing into the bridge converters 2a to 2c, through current transformers (CT) 8. $i^*_U$, $i^*_V$ and $i^*_W$ are reference current signals having different phases, respectively. Frequencies of the outputs of the cycloconverter changes in accordance with frequencies of reference current signals. The load currents change in accordance with the amplitudes of the reference current signals. Adders 9a to 9c, respectively, produce signals denoting the differences between reference current signals and load currents or the outputs from the current detector circuits. The difference signals are inputted to amplifier circuits 10a to 10c, respectively. Reference numeral 11 designates a reference voltage signal which is a constant DC voltage in the present embodiment. The output signals from the amplifiers 10a to 10c, respectively, are designated by PHi and referred to as phase control input signals corresponding to the above-mentioned differences. A reference voltage signal is denoted by PHv. Switches 12a to 12c constituting the switching means are actuated by the signals $L_U$, $L_V$ and $L_W$ at different timings respectively. The output signals from the switches after those are switched are applied to phase control circuits 13a to 13c, respectively. The output pulses from the phase control circuits 13a, 13b and 13c are respectively applied as control signals to the gates of the SCRs of the bridge converters, via corresponding gate pulse amplifiers 14a to 14c.

Figure 2:
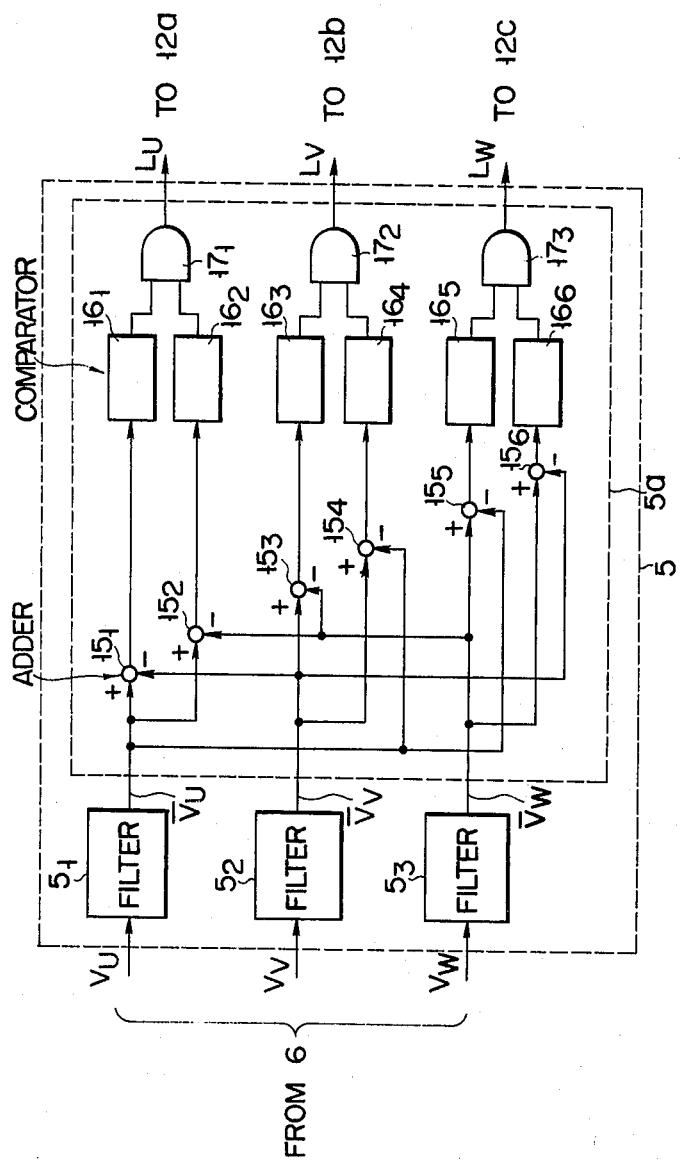
FIG. 2 is a circuit diagram of a switching signal generator used in the circuit shown in FIG. 1.

An example of the construction of the switching signal generator 5 will be described with reference to FIG. 2. Voltages $V_U$, $V_V$ and $V_W$ of the respective phases of the load 3 taken out through the PT 6 are respectively applied to filters $5_1$ to $5_3$ for removing ripple components contained in the voltages are removed to form voltages $\overline{V}_U$, $\overline{V}_V$ and $\overline{V}_W$ each with a waveform well similar to a sinusoidal waveform. As shown, $\overline{V}_U$ appears at the plus terminal of an adder $15_1$ and $\overline{V}_V$ at the minus terminal; $\overline{V}_U$ appears at the plus terminal of an adder $15_2$ and $\overline{V}_W$ at the minus terminal; $\overline{V}_V$ appears at the plus terminal of an adder $15_3$ and $\overline{V}_W$ at the minus terminal; $\overline{V}_V$ appears at the plus terminal of an adder $15_4$ and $\overline{V}_U$ at the minus terminal; $\overline{V}_W$ appears at the plus terminal of adder $15_5$ and $\overline{V}_U$ at the minus terminal; $\overline{V}_W$ appears at the plus terminal of an adder $15_6$ and $\overline{V}_V$ at the minus terminal. A comparator $16_1$ compares $\overline{V}_U$ with $\overline{V}_V$; a comparator $16_2$ compares $\overline{V}_U$ with $\overline{V}_W$; a comparator $16_3$ compares $\overline{V}_V$ with $\overline{V}_W$; a comparator $16_4$ compares $\overline{V}_V$ with $\overline{V}_U$; a comparator $16_5$ compares $\overline{V}_W$ with $\overline{V}_U$; a comparator $16_6$ compares $\overline{V}_W$ with $\overline{V}_U$. Each comparator produces "1" when it receives a positive input signal, while produces "0" when it receives a negative one. The output signals from the comparators $16_1$ and $16_2$ are applied to an AND gate $17_1$; the output signals from the comparators $16_3$ and $16_4$ to an AND gate $17_2$; the outputs from the comparators $16_5$ and $16_6$ to an AND gate $17_3$. With this connection, the AND gate $17_1$ produces a signal $L_U$ to turn the switch 12a to the PHv during a period that the $\overline{V}_U$ is larger than the remaining two phase voltages. The AND circuit $17_2$ produces a signal $L_V$ to turn the switch 12b to the PHv when $\overline{V}_V$ is larger than the remaining two phase voltages. The AND gate $17_3$ produces a signal to turn the switch 12c to PHv when $\overline{V}_W$ is larger than the remaining ones.

Figure 3A:
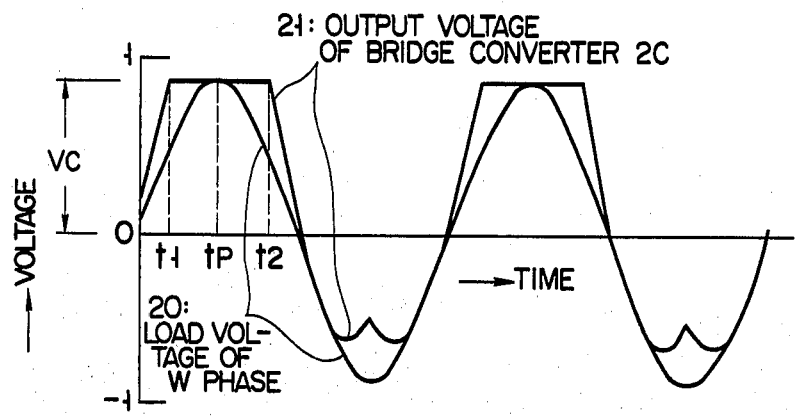
FIGS. 3A and 3B graphically illustrate relationships between the output voltage of a bridge converter and a corresponding phase voltage of the load shown in FIG. 1.
Figure 3B:
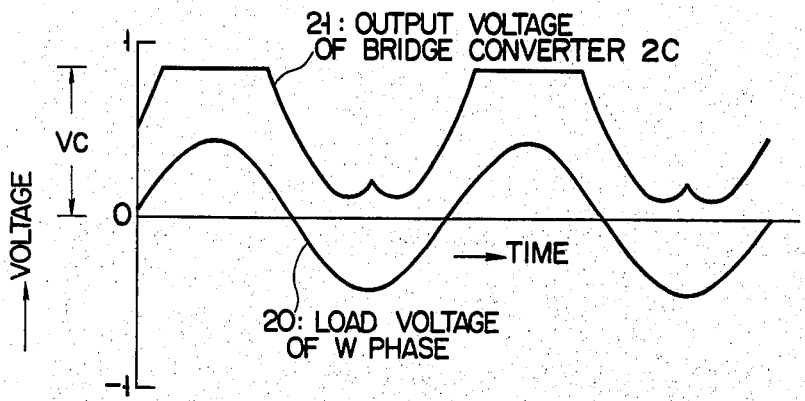

The operation of the control apparatus for the cycloconverter system shown in FIG. 1 will be described with reference to FIGS. 3A and 3C. Only the control of the bridge converter 2c will be described since the controls of the bridge converters 2a to 2c are the same. In FIG. 3A, the abscissa represents time and the ordinate represents waveforms of voltages of which the ripple components arising from the commutation of the thyristors are removed. Reference numeral 20 designates a sinusoidal voltage waveform of W phase of the load 3 and numeral 21 designates an output voltage waveform of the bridge converter 2c, that is, a waveform of the voltage between the common connection point of the bridge converters 2a to 2c and the output terminal of the bridge converter 2c. The output voltage 21 of the bridge converter 2c is controlled so as to have a fixed positive value $V_c$ during a period over an electrical angle of 120°, that is, during the time period between time points $t_1$ and $t_2$. The center of time period is located at a maximum positive amplitude point $t_p$ of the load voltage of W phase. The output voltage control during this time period is made by the reference voltage signal PHv. During the remaining time period of one cycle of the W phase voltage, i.e. over 240° electrical angle, the output voltage of the bridge converter 2c is controlled by the phase control input signal PHi which is dependent on the difference between the reference current i*$_W$ and the load current i$_W$. In FIG. 3A, the output voltage of the bridge converter 2c is denoted by 1 when the control delay angle α of the SCR's is zero. The waveform 21 of the output voltage shown is when the control delay angle α is 30° or the control advance angle is 30°. FIG. 3A shows a case where the load voltage of W phase is approximately maximum, while FIG. 3B shows a case where the load voltage of W phase is about ½ that in FIG. 3A. As seen from the figure, the wave form 21 of the output voltage of the bridge converter 2c is deviated to the positive side. Further, a period between t$_1$ and t$_2$ providing a high level voltage V$_c$ is longer than that obtained by the conventional control method. Although not illustrated, it is seen that when the load voltage 20 is near zero, the output voltage of the cycloconverter 2 has substantially a fixed positive value. It should be understood here that although the output voltage waveforms of only the bridge converter 2c are illustrated in FIGS. 3A and 3B, the similar waveforms of the output voltages of the remaining bridge converters 2b and 2a are superposed on the waveform 21 in FIG. 3A, being phased shifted by 120° one another.

Although the output voltage of the bridge converter 2c takes the waveform as shown in FIG. 3A, the phase voltage of the load and the load current may be controlled in a manner by the conventional control system. The reason for this follows. When an instantaneous value of one phase voltage of the load is assumed to be $V_l \sin \omega_l t$, the output voltage of one bridge converter is controlled during the electrical angle from $(\omega_l t = \pi/6)$ to $(\omega_l t = 5\pi/6)$ so as to have the fixed value Vc shown in FIG. 3A. Therefore, we have $$Vc = v_n + V_l \sin \omega_l t \quad (1)$$

where v$_n$ is a voltage at the neutral point 4 of the load 3 with respect to the common connection point of the bridge converters 2a to 2c and is expressed by an equation (2)

$$v_n = Vc - V_l \sin \omega_l t \quad (2).$$

That is, the voltage v$_n$ at the neutral point 4 of the load changes so as to satisfy the equation (2) every ⅓ period of one cycle of the phase voltage of the load. The output voltage of the bridge converter, subject to the current control by the phase control input signal PHi is the sum of the voltage v$_n$ of the load neutral point in the equation (2) and the phase voltage $V_l \sin \omega_l t$ of the load corresponding to the bridge converter. FIG. 3A illustrates a case where the peak value of the W-phase voltage 20 is equal to the output voltage of the bridge converter 2c which is controlled at the control delay angle α=30° or the control advance angle β=30°. By changing the neutral point voltage v$_n$ every ⅓ period of one cycle of the W-phase voltage of load, the output voltage of the bridge converter 2c is made smaller than the maximum value Vc of the output voltage of the bridge converter 2c in the vicinity of the negative peak value of the W-phase voltage, as shown in FIG. 3A. In other words, the maximum amplitude (peak to peak) of the output voltage of the bridge converter 2c is smaller than that (peak to peak) of the load W-phase voltage. This implies that if the load 3 is constant, the input voltage to the bridge converter 2c or the cycloconverter 2 may be lower than the input voltage to the conventional cycloconverter. Specifically, if the load is unchanged, the AC input voltage to the cycloconverter controlled by the control apparatus according to the present invention may be about 87% of the AC input voltage to the cycloconverter controlled by the conventional control apparatus. This indicates the improvement of the input power factor of the cycloconverter.

Figure 4A:
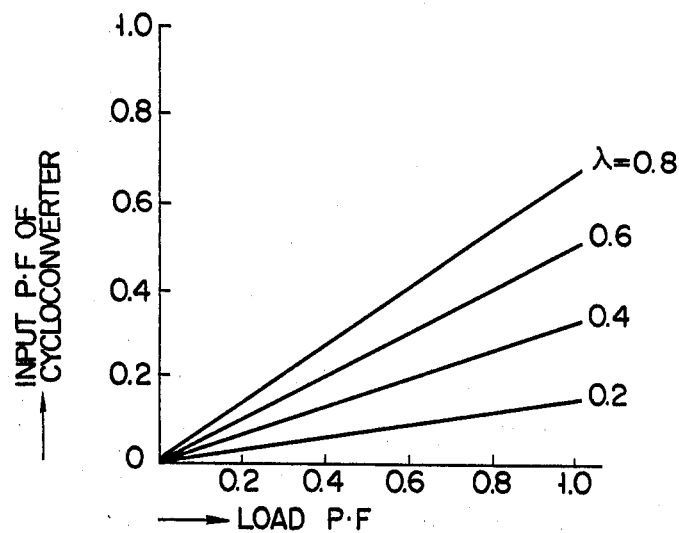
FIG. 4A is a graphical representation of a change of an input power factor of a conventional cycloconverter with respect to a load power factor.
Figure 4B:
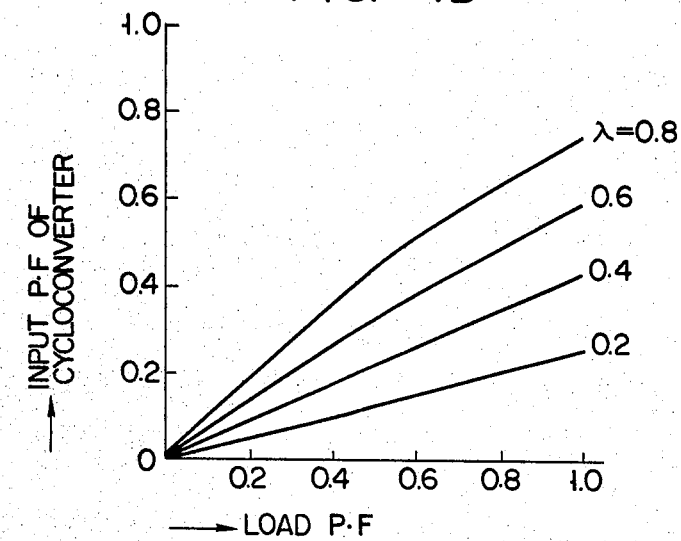
FIG. 4B is a graphical representation of a change of an input power factor to a cycloconverter controlled by a control apparatus of the present invention.

FIG. 4A illustrates an input power factor characteristic of the cycloconverter controlled by the conventional control apparatus. FIG. 4B illustrates an input power factor characteristic of the cycloconverter controlled by the control apparatus according to the present invention. In the graphs of FIGS. 4A and 4B, the abscissa represents a power factor of the load, the ordinate represent a power factor of the input to the cycloconverter, and the voltage conversion ratio λ is used as a parameter. Note here that the input voltage to the cycloconverter in FIG. 4B may be $\sqrt{3}/2$, while the input voltage to cycloconverter in FIG. 4A must be 1. From FIGS. 4A and 4B, it is seen that the control apparatus of the present invention can improve the input power factor of the cycloconverter. The power factor improvement may also be attained in the case of the delta-connected load.

Figure 5:
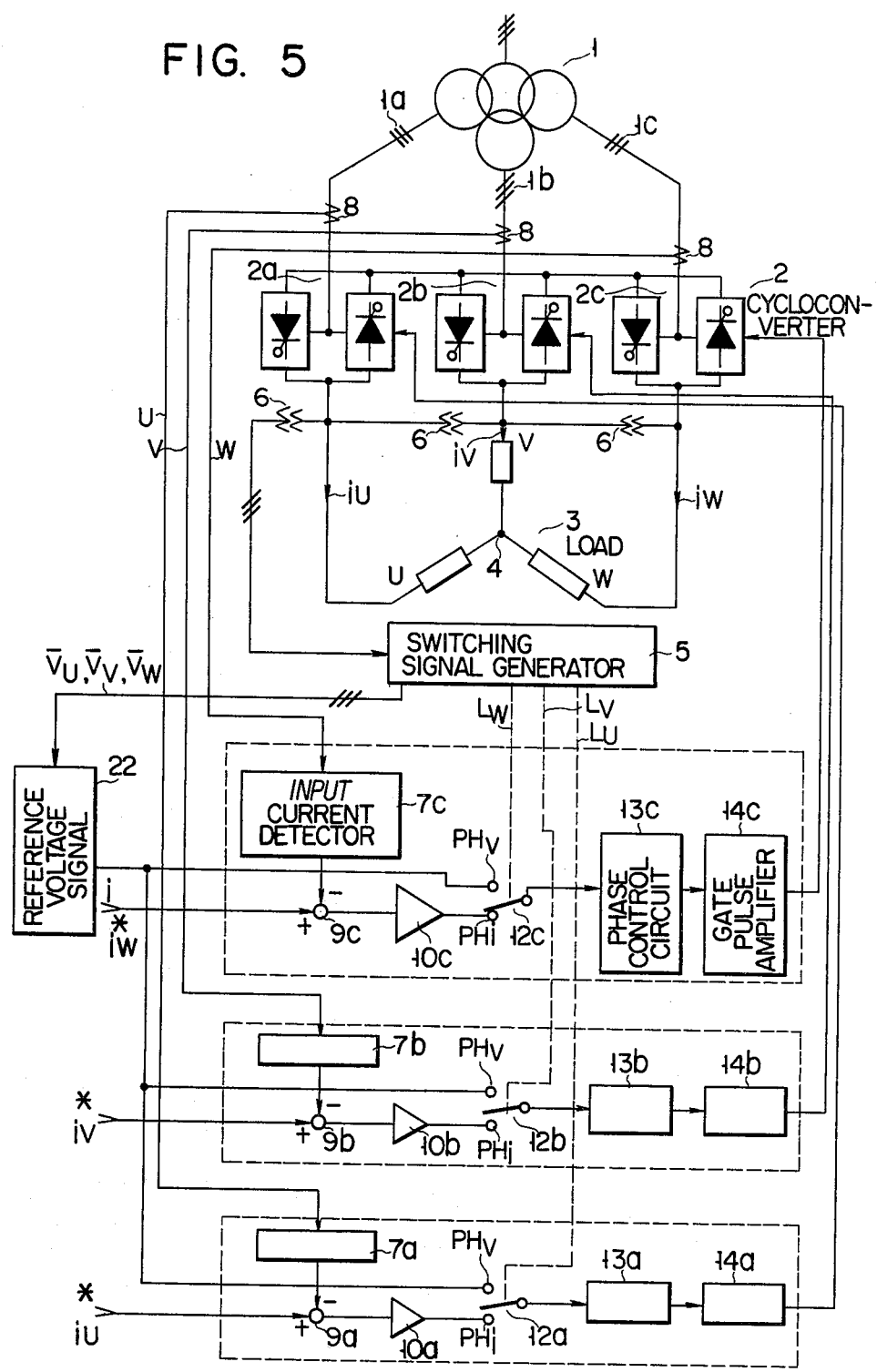
FIG. 5 is a circuit diagram of a cycloconverter system to which another embodiment of the present invention is applied.
Figure 6:
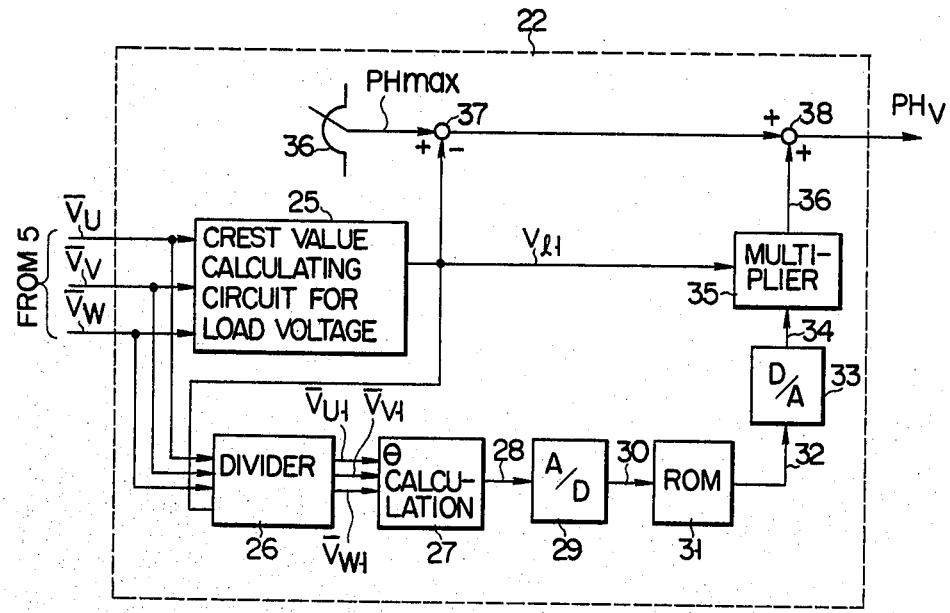
FIG. 6 is a block diagram of a reference voltage signal generator used in the circuit shown in FIG. 5.
Figure 7:
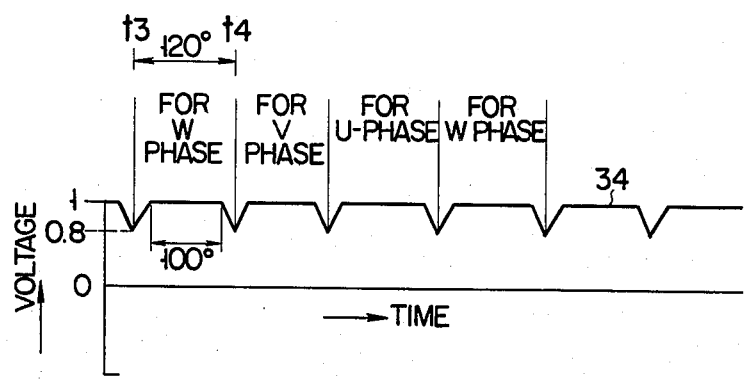
FIG. 7 is a waveform for illustrating the function of a ROM used in the circuit shown in FIG. 6.

Another embodiment of a control apparatus for a cycloconverter according to the present invention will be described hereinafter referring to FIG. 5. In the present embodiment, the reference voltage signal 11, or PHv, in the embodiment in FIG. 1 is substituted by a reference voltage signal PHv produced by a reference voltage generator 22. The reference voltage generator 22 receives three phase voltages from the load through the switching signal generator 5 to produce the reference voltage signal PHv. The major features of the present embodiment reside in that the amplitude of the output voltage of the bridge converter within the voltage control period from t$_1$ to t$_2$ in FIG. 3A may be changed and that the amplitude of the output voltage of the bridge converter within the positive half cycle of the load voltage may be kept constant over a given electrical angle (smaller than 1, period of one cycle of the load voltage), the center of the 1/m period being located at the maximum positive peak point of the load voltage. In FIG. 6, there is shown a circuit construction of the reference voltage signal generator 22. The load voltages $\overline{V}_U$, $\overline{V}_V$ and $\overline{V}_W$ of which the ripple components are removed are supplied from the switching signal generator 5 to the reference voltage signal generator 22. A crest value calculating circuit 25 receives the voltages $\overline{V}_U$, $\overline{V}_V$ and $\overline{V}_W$ and calculates a crest value $V_{l1}$ of the load voltage by an equation $V_{l1} = \sqrt{2/3} \cdot (V_U^2 + V_V^2 + V_W^2)$. A divider 26 receives the voltages $\overline{V}_U$, $\overline{V}_V$ and $\overline{V}_W$, and the crest value V$_{l1}$ and divides the voltages $\overline{V}_U$, $\overline{V}_V$ and $\overline{V}_W$ by the crest value V$_{l1}$, and produces three phase voltages $\overline{V}_{U1}$, $\overline{V}_{V1}$ and $\overline{V}_{W1}$ having a fixed crest value. A voltage phase calculating circuit 27 calculates the phases of the input voltages $\overline{V}_{U1}$, $\overline{V}_{V1}$ and $\overline{V}_{W1}$ to produce an analog signal 28 representative of a phase angle θ. An A/D converter 29 converts the output signal 28 from the phase calculating circuit 27 into a digital signal 30. A read only memory (ROM) 31 stores the digital data corresponding to a waveform 34 shown in FIG. 7. The contents of the ROM 31 is read out corresponding to the output timing of the output signal 30 from the A/D converter 29. As indicated by the waveform 34 in FIG. 7, the ROM 31 stores digital data which is periodically read out for producing the same waveforms every 120° of electrical angle. More specifically, the ROM 31 stores data of "1" corresponding to the peak value of the load phase voltage which extends over about 100° electrical angle with its center coincident with the peak value in the positive half wave of the load voltage, and stores data which gradually reduces from "1" to "0.8" in the remaining part of the period of 120° electrical angle. The output signal 32 from the ROM 31 is converted into an analog signal 34 by a D/A converter 33. A multiplier 35 multiplies the output signal $V_{l1}$ from the crest value calculating circuit 25 by the output signal 34 from the D/A converter 33 to produce an output signal 36. A potentiometer 36 produces the maximum output voltage PHmax for causing the bridge converters 2a to 2c to produce a maximum output. A first adder 37 subtracts the crest value $V_{l1}$ from the output signal PHmax from the potentiometer. A second adder 38 sums the output voltage from the first adder 37 and the output 36 from the multiplier 35 to produce a reference voltage signal PHv. The reference voltage signal PHv is used for the gate control of the thyristors in the bridge converters 2a to 2c, as shown in FIG. 5.

Figure 8:
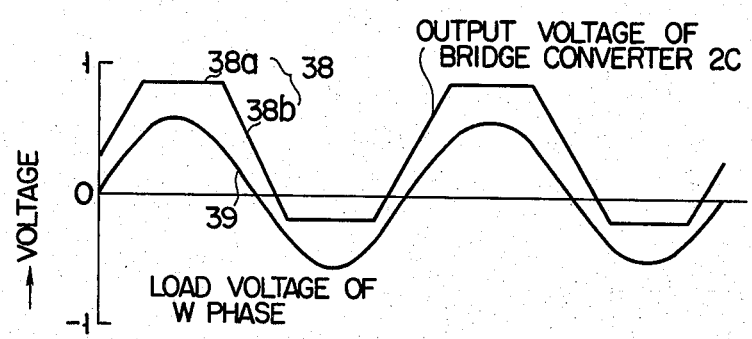
FIG. 8 is waveforms for illustrating a relationship between a phase voltage of the load and an output voltage of a bridge converter shown in FIG. 5.

The operation of the reference voltage generator 22 shown in FIG. 6 will be described with reference to FIG. 8. The output voltages $\overline{V}_{U1}$, $\overline{V}_{V1}$ and $\overline{V}_{W1}$ from the divider 26 are three phase AC voltages corresponding to the phase voltages of the load 3 with a fixed crest value. The phase angles $\theta$ of the phase voltage are detected by the voltage phase calculating circuit 27, so that the analog signal 28 corresponding to the phase angle $\theta$ is obtained. The phase angle $\theta$ is converted into a digital signal 30 by the A/D converter 29. The D/A converter 33 supplies the analog signal 34 corresponding to the period $t_3$ to $t_4$ in FIG. 7 to the multiplier 35. The output signal from the first adder 37 and the signal 36 as the product of the crest value $V_{l1}$ of the load voltage and the signal 34 are applied to the second adder 38 which in turn produces the reference voltage signal PHv. When the bridge converter 2c is controlled by the signal PHv during the voltage control period, or 1/m (120° in the case of three phase) through the phase control circuit 13c and the gate pulse amplifier 14c in FIG. 5, the output voltage waveform in the bridge converter 2c is controlled to be a trapezoidal waveform denoted as 38 in FIG. 8. The waveform 38 contains a portion 38a with a fixed value determined by the PHmax (corresponding to the voltage control) and a part 38b (corresponding to the current control) with a slope which is proportional to the load W phase voltage. FIG. 8 comparatively illustrates the output waveform of the bridge converter 2c corresponding to the load W-phase and the waveform of the load W-phase voltage 39. Incidentally, the output voltage waveforms from the bridge converter 2b corresponding to the load V phase and the bridge converter 2a corresponding to the load V phase appear phase-shifted by 120° and 240° with respect to the output voltage waveform of the bridge converter 2c, respectively. The embodiment shown in FIG. 5 may more improve the input power factor of the cycloconverter 2 than the embodiment shown in FIG. 1 of which the power factor is illustrated in FIG. 4B.

According to the present embodiment, in the case of three phase load, if the load currents of two phases are controlled to have a sinusoidal waveform, symmetrical three phase load currents are obtained in accordance with a relation $i_U + i_V + i_W = 0$. The output voltage of the cycloconverter 2 is so controlled that any one of the bridge converters 2a to 2c produces a high output voltage (for example, a portion 38a in FIG. 8). Therefore, the voltage at the neutral point 4 of the load 3 changes dependent on the high output voltage in accordance with the equation (2). Accordingly, the cycloconverter 2 is operated so as to always produce the high output voltage. As a consequence, the input reactive power to the cycloconverter 2 is small, so that the input power factor is improved more than that of the conventional cycloconverter system in which the output voltage of each bridge converter is controlled so as to have a sinusoidal waveform. Since the common connection point of the bridge converters 2a to 2c is disconnected from the neutral point 4 of the load 3, the neutral point voltage of the load exists, so that the amplitude (that between the positive peak value and the negative peak value) of the load voltage is larger than the amplitude (that between the minimum value and the maximum value) of the cycloconverter 2. This fact implies that the input AC voltage to the cycloconverter may be smaller than that of the conventional cycloconverter system. Therefore, the input power factor of the cycloconverter may be made large and further it realizes the size-down and cost-down of the cycloconverter system.

What we claim is:

1. A control apparatus for a cycloconverter which is connected to a multiphase AC power source and includes m sets of bridge converters each of which has a first output terminal connected to a common connection point and a second output terminal connected to a corresponding input terminal of a m-phase load (m ≧ 3) disconnected from said common connection point, and is comprised of silicon controlled rectifier (SCR) elements, said control apparatus comprising:

voltage control means for controlling the output voltages of said bridge converters in accordance with a predetermined reference voltage signal;

current control means for controlling the output voltages from said bridge converters in accordance with a phase control input signal dependent on a difference between a reference current signal to determine the output currents from said bridge converters and the load currents of said load; and switching means for periodically switching said voltage control means and said current control means in accordance with a phase of the load voltage;

wherein said voltage control means controls by said reference voltage signal the output voltage of the bridge converter corresponding to a load voltage during a 1/m period of one cycle of said load voltage, the center of said 1/m period being located at a positive or negative maximum amplitude point of said load voltage, and said current control means controls by said phase control input signal the output voltage of said bridge converter during the remaining (1 − 1/m) period of said one cycle of said load voltage.

2. A control apparatus for a cycloconverter according to claim 1 wherein said control apparatus further comprises phase control circuits and amplifier circuits for amplifying the outputs of said phase control circuits to obtain gate control signals for said SCR's;

said switching means includes a switching signal generator for detecting the phases of said loop voltages to produce switching signals, and change-over-switches actuated by the outputs of said switching signal generator;

said voltage control means supplies said reference voltage signal to said phase control circuits;

said current control means comprises current detector circuits for detecting AC input currents to said load, adders for producing difference signals between said reference current signals and the outputs of said current detector circuits; and amplifiers for amplifying the outputs of said adders to supply the outputs of said amplifiers to said phase control circuits.

3. A control apparatus for a cycloconverter according to claim 2, wherein said switching signal generator includes a logic circuit for generating output signals to actuate said change-over-switches so as to apply said reference voltage signal to said phase control circuits only during a period that when the respective phase voltages of said load are compared with one another and one given phase voltage is larger than the remaining phase voltages.

4. A control apparatus for a cycloconverter according to claim 3, wherein said switching signal generator further includes filters for removing ripple voltages contained in the respective phase voltages of said load.

5. A control apparatus for a cycloconverter according to claim 1, further comprising a reference voltage generator for controlling a waveform of said reference voltage signal; said reference voltage generator comprising: a crest value calculating circuit for calculating a crest value of the load voltage on the basis of the respective phase voltages of said load; a divider for producing phase voltages with a fixed crest value by dividing the respective phase voltages of said load by the output voltage from said crest value calculating circuit; a voltage phase calculating circuit for calculating phase angles $\theta$ of the output voltages from said divider; an A/D converter for A/D converting the output signal from said phase calculating circuit; a read only memory (ROM) which stores a voltage periodically changing in accordance with a waveform of a predetermined reference voltage signal in the form of digital data and of which the contents are read out in accordance with the output signal from said A/D converter; a D/A converter for D/A converting the output signal from said ROM; a multiplier for multiplying the output signal from said D/A converter by the output signal from said crest value calculating circuit; a potentiometer for producing a maximum value of said reference voltage signal; a first adder for producing a difference between the output value of said potentiometer and the output voltage of said crest value calculating circuit; and a second adder for summing the output signal from said first adder and the output signal from said multiplier to produce said reference voltage signal.

6. A control apparatus for a cycloconverter according to claim 1, wherein said reference voltage signal is a DC voltage with a fixed amplitude.

* * * * *